(12) United States Patent
Karras

(10) Patent No.: US 8,781,271 B1
(45) Date of Patent: Jul. 15, 2014

(54) COMPACT TIME DELAY UNIT

(75) Inventor: Thomas W. Karras, Berwyn, PA (US)

(73) Assignee: Lockheed Martin Corporation, Bethesda, MD (US)

(*) Notice: Subject to any disclaimer, the term of this patent is extended or adjusted under 35 U.S.C. 154(b) by 78 days.

(21) Appl. No.: 13/564,677

(22) Filed: Aug. 1, 2012

Related U.S. Application Data

(60) Provisional application No. 61/522,670, filed on Aug. 11, 2011.

(51) Int. Cl.
*G02B 6/26* (2006.01)

(52) U.S. Cl.
USPC .......... 385/21; 257/E31.095; 438/25; 385/15; 385/20

(58) Field of Classification Search
CPC .. G02B 6/12007; G02B 6/29395; G02B 6/35; G02B 6/43; G02B 6/356; G02B 6/3562; G02B 6/3544; G02B 6/3546; H04Q 11/0005
USPC .......................................... 385/15, 16, 20, 21
See application file for complete search history.

(56) References Cited

U.S. PATENT DOCUMENTS

| | | | | |
|---|---|---|---|---|
| 5,455,878 | A * | 10/1995 | Thaniyavarn | 385/16 |
| 5,926,589 | A * | 7/1999 | Gaeta | 385/16 |
| 7,010,230 | B2 * | 3/2006 | Lee et al. | 398/102 |
| 2009/0027268 | A1 * | 1/2009 | Coward | 342/375 |
| 2009/0129779 | A1 * | 5/2009 | Bernasconi et al. | 398/79 |

OTHER PUBLICATIONS

Sun, et al., "Low-loss slow light inside high contrast grating waveguide", High Contrast Metastructures, Proceedings of the SPIE, 2012, pp. 82700A, vol. 8270.
Overton, "Integrated Photonics: High contrast gratings forge ultralow-loss, slow-light waveguide", Laser Focus World, Mar. 27, 2012.
Zablocki, et al., "Chip-scale photonic routing fabrics for avionic and satellite applications", Avionics, Fiber-Optics and Photonics Technology Conference (AVFOP), Oct. 4-6, 2011, IEEE, pp. 75-76.
"Photonic Crystals: Photonic-crystal switch is ultracompact", Laser Focus World, Mar. 1, 2008, retrieved from <http://www.laserfocusworld.com/articles/print/volume-44/issue-3/world-news/photonic-crystals-photonic-crystal-switch-is-ultracompact.html>.
Rylyakov, et al., "Silicon Photonic Switches Hybrid-Integrated With CMOS Drivers", IEEE Journal of Solid-State Circuits, Jan. 2012, pp. 1-10, vol. 47, No. 1.

* cited by examiner

*Primary Examiner* — Ellen Kim
(74) *Attorney, Agent, or Firm* — McDermott Will & Emery LLP

(57) ABSTRACT

A compact photonic time delay unit. The unit includes a plurality of compact optical delay elements, a plurality of delay bypass elements, with each delay bypass element being associated with a respective one of the compact optical delay elements, and a plurality of compact optical switches. Each of the compact optical switches is configured to controllably switch an optical signal through one of the compact optical delay elements or through the associated delay bypass element. In some aspects, the compact optical delay elements, delay bypass elements, and compact optical switches are disposed on a single electro-optical chip.

18 Claims, 2 Drawing Sheets

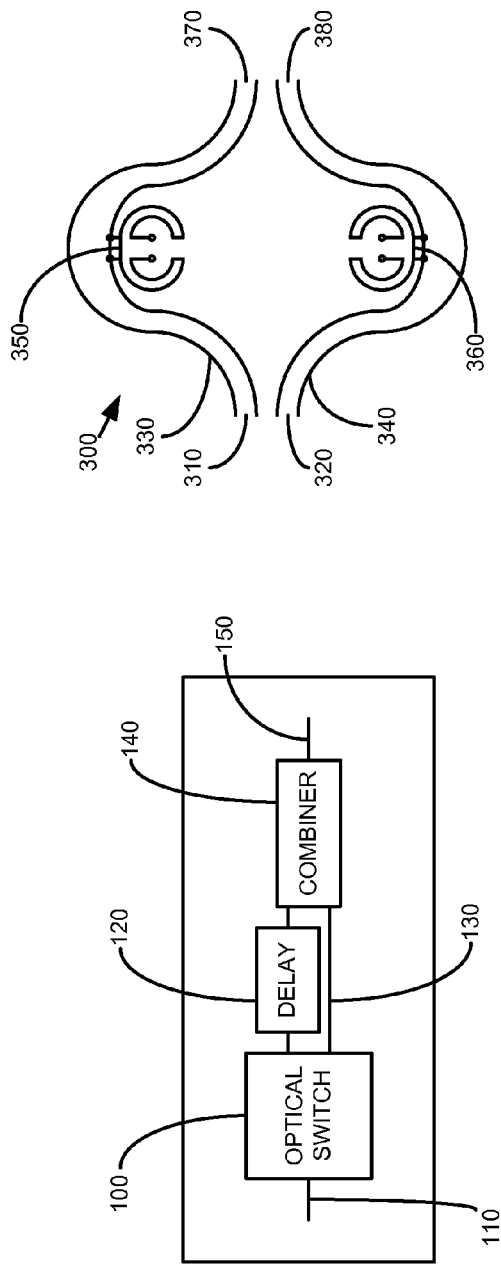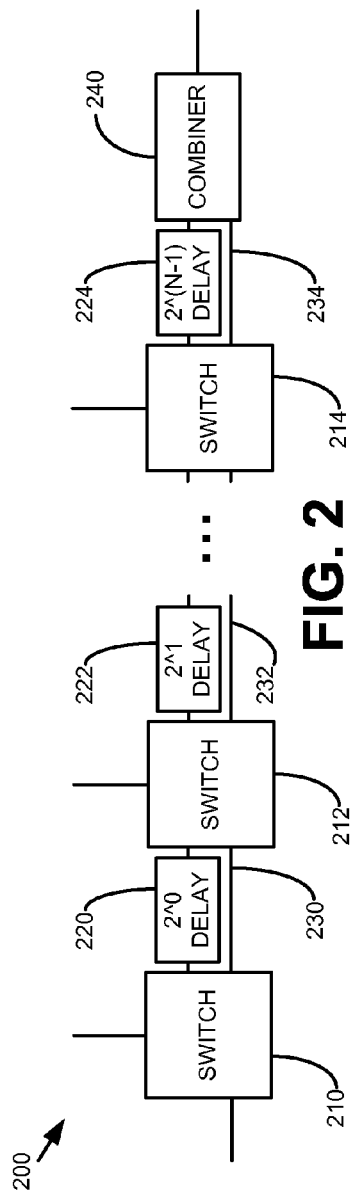

COMPACT TIME DELAY UNIT

CROSS-REFERENCE TO RELATED APPLICATION

This application claims the benefit of U.S. Provisional Application No. 61/522,670, filed Aug. 11, 2011, entitled "COMPACT TIME DELAY UNIT," the disclosure of which is hereby incorporated by reference in its entirety including attachments for all purposes.

STATEMENT REGARDING FEDERALLY SPONSORED RESEARCH OR DEVELOPMENT

Not applicable.

BACKGROUND

The present invention generally relates to compact photonic time delay units.

Variable true time delay for different signal paths are increasingly needed for space applications like phased arrays with wide fields of regard. Photonic transmission media can provide low loss delay with very wide bandwidth when used with modulated optical carriers. However, an array of such waveguides and/or fibers needs to be appropriately directed with low loss, high bandwidth, low electrical power, and compact switches to be broadly useful.

SUMMARY

According to one aspect of the present disclosure, a compact photonic time delay unit is provided. The unit includes a plurality of compact optical delay elements, a plurality of delay bypass elements, with each delay bypass element being associated with a respective one of the compact optical delay elements, and a plurality of compact optical switches. Each of the compact optical switches is configured to controllably switch an optical signal through one of the compact optical delay elements or through the associated delay bypass element.

The compact optical delay elements, delay bypass elements, and compact optical switches are disposed on a single electro-optical chip.

According to another aspect of the present disclosure, a method of making a compact photonic time delay unit is provided. The method includes disposing a plurality of compact optical delay elements on a single electro-optical chip, disposing a plurality of delay bypass elements on the single electro-optical chip, and disposing a plurality of compact optical switches on the single electro-optical chip. Each delay bypass element is associated with a respective one of the compact optical delay elements, and each of the compact optical switches is configured to controllably switch an optical signal through one of the compact optical delay elements or through the associated delay bypass element.

In some aspects, a substrate of the single electro-optical chip comprises a single material that forms substrates of the compact optical delay elements, the delay bypass elements, and the compact optical switches. An example of the single material is silicon.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 1 illustrates an example of an arrangement for a compact optical switch, a compact optical delay element, and a delay bypass element according to some aspects of the disclosure.

FIG. 2 illustrates an example of an arrangement for a compact photonic N-bit time delay unit according to aspects of the disclosure.

FIG. 3 illustrates an example of a Mach-Zehnder interferometer based switch according to some aspects of the disclosure.

DETAILED DESCRIPTION

Figure 5:
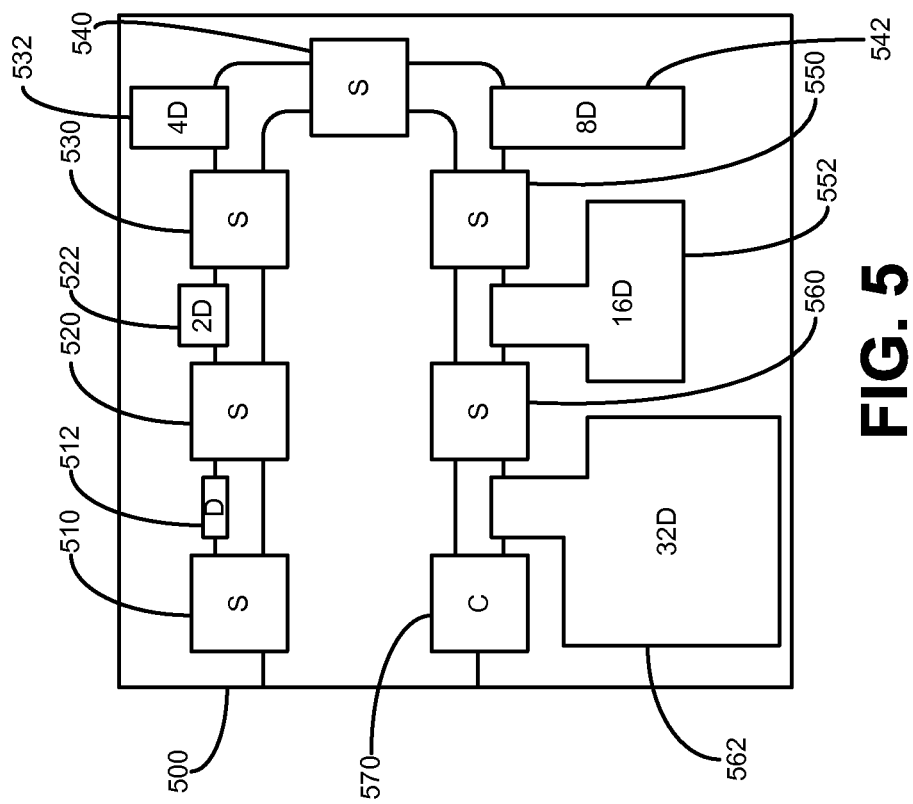
FIG. 5 illustrates an example of an arrangement of a compact photonic time delay unit on an electro-optical chip according to aspects of the disclosure.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Photonic transmission media can provide low loss delay with very wide bandwidth when used with modulated optical carriers. For example, propagation velocities with slow light of 0.1 to 0.01 c have been measured and predicted in waveguides, often using photonic crystals in silicon. An array of such waveguides may need to be appropriately directed with low loss, high bandwidth, low electrical power, and compact optical switches to provide the wide range of delays needed.

Compact optical switches can have low loss, high bandwidth, and low electrical power. Compact switch arrays based upon Mach-Zehnder interferometer (MZI) thermo-optic switches or a photonic crystal directional coupler can be used to direct an optical carrier through appropriate delay elements. Very compact optical switches may be built with dimensions of a few tens of microns, and the electrical power requirements can be on the order of milliwatts.

According to aspects of the subject technology, compact optical delay elements, delay bypass elements, and compact optical switches are disposed on a single electro-optical chip. This arrangement can be facilitated by using a single material as a substrate of the single electro-optical chip. This same material can also form substrates of the compact optical delay elements, the delay bypass elements, and the compact optical switches. One example of a suitable material for the substrates is silicon. As one possible result, a robust compact photonic time delay unit can be constructed relatively efficiently and inexpensively.

In some aspects, a switch array has a layout arranged to form to an N-bit time delay unit using onchip delay elements. Low loss waveguides with a sharp bend capability or slow light delay elements can be used if delays of nanosecond duration are to be accommodated on the same chip as the switch array. Waveguides exhibiting losses from 0.1 dB/centimeter can be built. Because loss over the length of a switch element may be very small, system loss may be driven by the longest delay element loss (e.g., 1 nanosecond→0.86 dB with silicon waveguides or <0.1 dB with slow light high contrast grating waveguides) and off-chip coupling losses (e.g., projected to be 1 dB).

A nanosecond low loss silicon waveguide delay element can be placed in a chip area of 2.5 millimeters×1.6 millimeters, and a nanosecond high contrast grating (HCG) waveguide delay element can be placed in a chip area of 1 millimeter scale. Thus, a multi delay unit assembly may be on a centimeter scale. The subject technology therefore provides a compact time delay unit. In some aspects, all elements may reside on a single silicon or silicon-on-insulator chip and therefore can be easily space qualified. As a result, the subject technology also is likely to be inexpensive when made in quantity. In some aspects, the subject technology may be used in various markets, including for example and without limitation, photonics and optical computing markets, in addition to radar and active phased arrays markets.

FIG. 1 illustrates an example of an arrangement for a compact optical switch, a compact optical delay element, and a delay bypass element according to some aspects of the disclosure. Optical switch 100 switches an optical signal from input 110 to optical delay element 120 or to delay bypass element 130. The optical signal is then combined by combiner 140 to output 150.

In some aspects, optical switch 100 is compact with micron scale dimensions. Thus, several optical switches 100 can fit on a single electro-optical chip. Examples of compact optical switches include variations on Mach-Zehnder interferometer and photonic crystal directional coupler based switches. This disclosure is not limited to these examples. Input 110 to the optical switch can be a fiber or other waveguide, as can the outputs of the optical switch.

Optical delay element 120 also is compact in some aspects of the disclosure, having micron or millimeter scale dimensions. Examples of compact optical delay elements include low loss waveguides with a sharp bend capability or slow light delay elements. Delay bypass element 130 for bypassing optical delay element is a waveguide according to some aspects of the disclosure.

According to aspects of the subject technology, the optical switches and delay elements use a common material as their substrates. This material also can be the substrate of a single electro-optical chip on which the switches and delay elements are disposed. The arrangement tends to permit small overall compact photonic time delay units to be manufactured relatively inexpensively in robust damage-resistant packages.

FIG. 2 illustrates an example of an arrangement for a compact photonic N-bit time delay unit according to aspects of the disclosure. Time delay unit 200 includes N stages of the arrangement shown in FIG. 1. Three of the N stages are shown, with ellipsis representing that more stages can be present. The shown stages include optical switches 210, 212, and 214, optical delay elements 220, 222, and 224, and delay bypass elements (e.g., waveguides) 230, 232, and 234. Also shown is combiner 240 at the end of the compact photonic time delay unit. Combiners and splitters may also be present between the stages in a case that the switching elements need an input optical signal to be present on both inputs for proper functioning. Alternatively, some switching elements can switch optical signals from one input to one output, obviating the need for combiners and splitters between stages.

Some delay is introduced into an optical signal by delay bypass elements 230, 232, and 234. This delay is designated as bypass time BT in this disclosure. Thus, $BT_1$ to $BT_N$ are delay times that delay bypass elements 1 to N introduce into the optical signal when switched through those elements.

The optical delay elements introduce a longer delay into an optical signal. This delay is designated as delay time DT in this disclosure. In some aspects, the delay time introduced by an optical element equals the sum of the delay introduced by the corresponding bypass element and an extra delay. According to aspects of the disclosure, this extra delay is some power of two times a base delay time (BDT), which is a smallest delay time provided by the N-bit time delay unit corresponding to a delay value of 1. Mathematically, the relationship between the delay time DT, the bypass time BT, and the base delay time BDT for switch x of N switches in a photonic time delay unit according to aspects of the subject technology is the following:

$DT_X = BT_X + (2^{(x-1)} * BDT)$, where "*" is multiplication.

Thus, optical delay elements 220, 222, and 224 are labeled in FIG. 2 with delays of 2^0 delay, 2^1 delay, and 2^(N-1) delay, where "^" is exponentiation (e.g., 1 delay, 2 delay, and $2^{N-1}$ delay). In some aspects, the optical switches are controlled by signals corresponding to bits of an N bit binary number. If the bit of the binary number controlling each optical switch corresponds to the amount of delay introduced by the optical delay element immediately following that switch, then an extra delay equal to that binary number times the base delay time is added to an optical signal by compact photonic time delay unit 200.

FIG. 3 illustrates an example of a Mach-Zehnder interferometer based switch that can be used as a compact optical delay element according to some aspects of the disclosure. Switch 300 includes two inputs 310 and 320. A splitter (not shown) can feed an optical signal to both inputs. Switch 300 also includes two waveguide arms 330 and 340 of a Mach-Zehnder interferometer. Elements 350, for example thermal elements, can be disposed along the waveguide arms to control phase modulation of optical signals passing through the arms.

Other types of optical switches can be used according to aspects of the subject technology. Examples include but are not limited to other types of Mach-Zehnder interferometer based switches, photonic crystal directional coupler (PCDC) based switches that utilize slow light effects, and silicon photonic switches that are hybrid-integrated with CMOS drivers such as p-i-n diode phase shifters.

Figure 4:
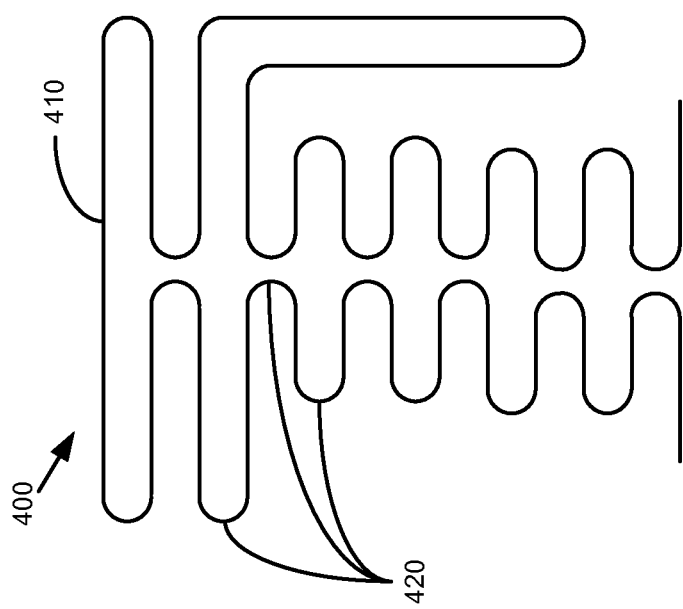
FIG. 4 illustrates another example of a compact optical delay element according to some aspects of the disclosure.

FIG. 4 illustrates an example of a compact optical delay element according to some aspects of the disclosure. Delay element 400 is formed from low loss waveguide 410 with a sharp bend capacity. Waveguides etched or deposited into a substrate can be used. Bends 420 (not all labeled) having a size of more than several wavelengths of an optical carrier can be implemented with little or no phase distortions or losses. As shown in FIG. 4, the waveguides can be bent to cover available real-estate, for example on an electro-optical chip. In some aspects, a 1 nanosecond delay element formed of such waveguides can exhibit less than 1 dB/centimeter of loss and cover an area of 2.5 millimeters by 1.6 millimeters. Waveguides providing different delays, exhibiting different losses, and covering different areas can be used.

Other types of optical delay elements can be used according to aspects of the subject technology. Examples include but are not limited to high contrast gratings (HCGs) that exhibit slow light properties, optical delay elements based on photonic crystal directional couplers, and other elements that exhibit slow light effects.

FIG. 5 illustrates an example of an arrangement of a compact photonic time delay unit on an electro-optical chip according to aspects of the disclosure. Electro-optical chip 500 includes 6 stages of a time delay unit. Thus, electro-optical chip 500 includes compact optical switches 510, 520, 530, 540, 550, and 560 (denoted "S" in the figure), and compact delay elements 512, 522, 532, 542, 552, and 562. Different delays for these elements are denoted as D, 2D, 4D, 8D, 16D, and 32D, representing different powers of two times a base delay time D. In some aspects, combiner 570 (denoted "C" in the figure) can be used to combine optical signals from a last optical switch and last delay element into an output signal. The switches and delay elements are arranged in FIG. 5 to efficiently use space on chip 500. Other arrangements can be used.

According to some aspects, the switches are controlled by electrical signals representing bits of an N-bit binary number. Hence, the compact photonic time delay unit on electro-optical chip 500 is a 6-bit time delay unit. Compact optical time delay units that include more or fewer stages, and therefore correspond to more or fewer bits, are also within the subject technology. For some applications, a 7-bit time delay unit has been found to provide sufficient granularity to be useful for some optical phased array applications.

On aspect of the subject technology includes making a compact photonic time delay unit such as chip 500 by disposing a plurality of compact optical delay elements on the chip, disposing a plurality of delay bypass elements on the chip, and disposing a plurality of compact optical switches on the chip. This process can be made more efficient in some aspects by selecting delay elements, bypass elements, and the switches that use a common single material as their substrates. The chip in turn can provide that substrate. An example of a suitable material includes but is not limited to silicon.

In the foregoing, a phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Likewise, while operations are depicted in the drawings in a particular order, this should not be understood as requiring that such operations be performed in the particular order shown or in sequential order, or that all illustrated operations be performed, to achieve desirable results. For example, switching through shorter delay elements need not occur before switching through longer delay elements.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

These and other implementations are within the scope of the following claims.

What is claimed is:

1. A compact photonic time delay unit, comprising:
   a plurality of compact optical delay elements;
   a plurality of delay bypass elements, with each delay bypass element being associated with a respective one of the compact optical delay elements;
   a plurality of compact optical switches, each of the compact optical switches configured to controllably switch an optical signal through one of the compact optical delay elements or through the associated delay bypass element; and
   a combiner configured to combine optical signals from a last compact optical switch and a last compact optical delay element into an output signal,
   wherein the compact optical delay elements, delay bypass elements, compact optical switches, and combiner are disposed on a single electro-optical chip.

2. The compact photonic time delay unit of claim 1, wherein a substrate of the single electro-optical chip comprises a single material that forms substrates of the compact optical delay elements, the delay bypass elements, and the compact optical switches.

3. The compact photonic time delay unit of claim 2, wherein the single material comprises silicon.

4. The compact photonic time delay unit of claim 1, wherein N is a number of the compact optical delay elements, a number of the delay bypass elements, and a number of the compact optical switches, and
   wherein the compact optical delay elements, the delay bypass elements, and the compact optical switches form an N-bit time delay unit.

5. The compact photonic time delay unit of claim 4, comprising an input for a binary number having N bits, wherein each of the compact optical switches is configured to be controlled by one of the N bits.

6. The compact photonic time delay unit of claim 1, wherein at least one of the compact optical delay elements comprises a low loss waveguide with a sharp bend capability.

7. The compact photonic time delay unit of claim 1, wherein at least one of the compact optical delay elements comprises a slow light delay element.

8. A method of making a compact photonic time delay unit, comprising:

disposing a plurality of compact optical delay elements on a single electro-optical chip;

disposing a plurality of delay bypass elements on the single electro-optical chip;

disposing a plurality of compact optical switches on the single electro-optical chip; and disposing a combiner on the single electro-optical chip, wherein each delay bypass element is associated with a respective one of the compact optical delay elements;

wherein each of the compact optical switches is configured to controllably switch an optical signal through one of the compact optical delay elements or through the associated delay bypass element; and wherein the combiner is configured to combine optical signals from a last compact optical switch and a last compact optical delay element into an output signal.

9. The method of claim 8, wherein a substrate of the single electro-optical chip comprises a single material that forms substrates of the compact optical delay elements, the delay bypass elements, and the compact optical switches.

10. The method of claim 9, wherein the single material comprises silicon.

11. The method of claim 8, wherein N is a number of the compact optical delay elements, a number of the delay bypass elements, and a number of the compact optical switches, and wherein the compact optical delay elements, the delay bypass elements, and the compact optical switches form an N-bit time delay unit.

12. The method of claim 11, comprising disposing an input for a binary number having N bits on the single electro-optical chip, wherein each of the compact optical switches is configured to be controlled by one of the N bits.

13. The method of claim 8, wherein at least one of the compact optical delay elements comprises a low loss waveguide with a sharp bend capability.

14. The method of claim 8, wherein at least one of the compact optical delay elements comprises a slow light delay element.

15. The compact photonic time delay unit of claim 1, wherein at least one of the plurality of compact optical delay elements comprises a plurality of bends.

16. The compact photonic time delay unit of claim 1, wherein at least one of the plurality of compact optical switches is a Mach-Zehnder interferometer based switch.

17. The method of claim 8, wherein at least one of the plurality of compact optical delay elements comprises a plurality of bends.

18. The method of claim 8, wherein at least one of the plurality of compact optical switches is a Mach-Zehnder interferometer based switch.

* * * * *